(12) United States Patent
Chaudhuri et al.

(10) Patent No.: US 7,330,848 B2
(45) Date of Patent: *Feb. 12, 2008

(54) METHOD AND APPARATUS FOR GENERATING STATISTICS ON QUERY EXPRESSIONS FOR OPTIMIZATION

(75) Inventors: Surajit Chaudhuri, Redmond, WA (US); Nicolas Bruno, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

This patent is subject to a terminal disclaimer.

(21) Appl. No.: 10/444,829

(22) Filed: May 23, 2003

(65) Prior Publication Data

US 2004/0236762 A1 Nov. 25, 2004

(51) Int. Cl.
  G06F 7/00 (2006.01)
  G06F 17/30 (2006.01)
  G06F 17/00 (2006.01)
(52) U.S. Cl. .............................. 707/3; 707/2; 707/100; 707/102
(58) Field of Classification Search ...................... None
  See application file for complete search history.

(56) References Cited

U.S. PATENT DOCUMENTS

| | | | | |
|---|---|---|---|---|
| 5,091,852 A | * | 2/1992 | Tsuchida et al. ............... | 707/2 |
| 5,875,445 A | * | 2/1999 | Antonshenkov ............... | 707/2 |
| 5,918,225 A | * | 6/1999 | White et al. .................. | 707/3 |
| 6,691,101 B2 | * | 2/2004 | MacNicol et al. ............. | 707/2 |
| 6,782,421 B1 | * | 8/2004 | Soles et al. ................. | 709/223 |
| 6,947,927 B2 | * | 9/2005 | Chaudhuri et al. ............ | 707/3 |
| 2004/0225639 A1 | * | 11/2004 | Jakobsson et al. ............. | 707/2 |

OTHER PUBLICATIONS

Oracle9i Database Performance Tuning Guide and Reference, Release 2(9.2), Oct. 2002. Chapter 1, pp. 1-2 to 1-10, 1-14 to 1-24, 1-34 to 1-45; Chapter 3, pp. 3-20 to 3-26; Chapter 9, pp. 9-4 to 9-22.*
Bruno, N. & Surajit Chaudhuri, "Efficient creation of satistics over query expressions", in Proceedings of Data Engineering, 19th International Conference on Mar. 5-8, 2003, on pp. 201-212.*
S. Acharya, P.B. Gibbons, V. Poosala, and S. Ramaswamy, "Join Synopses for Approximate Query Answering", In Proceedings of the 1999 ACM Int'l Conference on Management of Data, 1999, pp. 275-286.
N. Bruno and S. Chaudhuri, "Exploiting Statistics on Query Expressions for Optimization", In Proceedings of the 2002 ACM Int'l Conference on Management of Data, 2002, pages: 12.

(Continued)

Primary Examiner—Apu Mofiz
Assistant Examiner—Susan Chen

(57) ABSTRACT

A method and apparatus for creating a statistical representation of a query result that can be performed without executing the underlying query. For a binary-join query, a scan is performed on one of the join tables. A multiplicity value that estimates the number of tuples in the other join table that has a matching join attribute to the scanned tuple is calculated. A number of copies (as determined by the multiplicity value) are placed in a stream of tuples that is sampled to compile the statistical representation of the query result. For acyclic-join generating queries including selections, the above procedure is recursively extended. If multiple statistical representations are sought, scans can be shared. Scan sharing can be optimized using shortest common supersequence techniques.

41 Claims, 5 Drawing Sheets

OTHER PUBLICATIONS

S. Chaudhuri, R. Motwani and V. Narasayya, "Random Sampling for Histogram Construction: How much is enough", In Proceedings of the 1998 ACM Int'l Conference on Management of Data, 1998, pages: 12.

S. Chaudhuri, R. Motwani and V. Narasayya, "On Random Sampling Over Joins", In Proceedings of the 1999 ACM Int'l Conference on Management of Data, 1999, pp. 263-274.

S. Chaudhuri, R. Motwani and V. Narasayya, "Automating Statistics Management for Query Optimizers", In Proceedings of the Sixteenth Int'l Conference on Data Engineering, 2000, pages: 10.

G. Nicosia and G. Oriolo, "Solving the Shortest Common Supersequence Problem", In Operation Research, Springer-Verlag, 2001, pages: 7.

V. Poosala and Y. Ioannidis, "Selectivity Estimation without the Attribute Value Independence Assumption", In Proceedings of the Twenty-third Int'l Conference on Very Large Databases, 1997, pages: 10.

V. Poosala, Y. Ioannidis, P. Haas and E. Shekita, "Improved Histograms for Selectivity Estimation of Range Predicates", In Proceedings of the 1996 ACM Int'l Conference on Management of Data, 1996, pp. 294-305, pages: 13.

P. Roy, S. Sheshadri, S. Sudarshan and S. Bhobe, "Efficient Algorithms for Multi Query Optimization", In Proceedings of the 2000 ACM Int'l Conference on Management of Data, 2000, pages: 12.

M. Stillger, G.M. Lohman, V. Markl and M. Kandil, "LEO-DB2's Learning Optimizer", In Proceedings of the Twenty Seventh Int'l Conference on Very Large Databases, 2001, pages: 10.

* cited by examiner

METHOD AND APPARATUS FOR GENERATING STATISTICS ON QUERY EXPRESSIONS FOR OPTIMIZATION

TECHNICAL FIELD

The invention relates generally to the field of relational databases and specifically to the field of optimizing queries on databases.

BACKGROUND OF THE INVENTION

Most query optimizers for relational database management systems (RDBMS) rely on a cost model to choose the best possible query execution plan for a given query. Thus, the quality of the query execution plan depends on the accuracy of cost estimates. Cost estimates, in turn, crucially depend on cardinality estimations of various sub-plans (intermediate results) generated during optimization. Traditionally, query optimizers use statistics built over base tables for cardinality estimates, and assume independence while propagating these base-table statistics through the query plans. However, it is widely recognized that such cardinality estimates can be off by orders of magnitude. Therefore, the traditional propagation of statistics that assumes independence between attributes can lead the query optimizer to choose significantly low-quality execution plans.

The query optimizer is the component in a database system that transforms a parsed representation of an SQL query into an efficient execution plan for evaluating it. Optimizers examine a large number of possible query plans and choose the best one in a cost-based manner. For each incoming query, the optimizer iteratively explores the set of candidate execution plans using a rule-based enumeration engine. After each candidate plan or sub-plan is generated, the optimizer estimates its execution cost, which in turn refines the exploration of further candidate plans. Once all "interesting" plans are explored, the most efficient one is extracted and passed on to the execution engine.

The cost estimation module is critical in the optimization process, since the quality of plans produced by the optimizer is highly correlated to the accuracy of the cost estimation routines. The cost estimate for a sub-plan, in turn, depends on cardinality estimations of its sub-plans. Traditionally, query optimizers use statistics (mainly histograms) that are built over base tables to estimate cardinalities. Histograms are accurate for estimating cardinalities of simple queries, such as range queries. For complex query plans, however, the optimizer estimates cardinalities by "propagating" base-table histograms through the plan and relying on some simplifying assumptions (notably the independence assumption between attributes).

The sub-plan shown in FIG. 3 can be used to demonstrate how base table histograms are used to estimate the cardinality of a SELECT-PROJECT-JOIN (SPJ) query. The query corresponding to the plan shown in FIG. 3 is SELECT*FROM R,S WHERE R.x=S.y AND S.a<10. If histograms over R.x, S.y, and S.a are available, the histograms over R.x and S.y are first used to estimate the cardinality of $R \bowtie S$ and then the histogram over S.a is propagated through the join upwards in the join-graph. The propagated histogram is then used to estimate the cardinality of Sa<10 over the intermediate result $R \bowtie S$, to finally obtain the cardinality of $\sigma_{S.a<10}(R \bowtie S)$.

When the cardinality estimation technique illustrated in FIG. 3 is used in query optimizers, three simplifying assumptions are relied on: independence, containment, and sampling. The independence assumption is relied on when propagating histogram $H_{S.a}$ over S.a through the join predicate $R \bowtie_{x=y} S$. This means that the bucket frequencies for $H_{S.a}$ are uniformly scaled down so that the sum of all frequencies in the propagated histogram equals the estimated cardinality of $R \bowtie_{x=y} S$. Implicit in this procedure is the assumption that distributions of attributes in R and S are independent.

The containment assumption is relied upon when estimating the cardinality of joins using histograms. The buckets of each histogram are aligned and a per-bucket estimation takes place, followed by an aggregation of all partial results. The containment assumption dictates that for each pair of buckets, each group of distinct valued tuples belonging to the bucket with the minimal number of different values joins with some group of tuples in the other bucket. For instance, if the number of distinct values in bucket $b_R$ is 10, and the number of distinct values in bucket $b_S$ is 15, the containment assumption states that each of the 10 groups of distinct valued tuples in $b_R$ join with one of the 15 groups of distinct valued tuples in $b_S$.

Random sampling is a standard technique for constructing approximate base-table histograms. Usually the approximated histograms are of good quality regarding frequency distribution. However, estimating the number of distinct values inside buckets using sampling is difficult. The sampling assumption states that the number of distinct values in each bucket predicted by sampling is a good estimator of the actual of distinct values.

Often one or more of the simplifying assumptions do not reflect real data values and distributions. For instance, many attributes are actually correlated and the independence assumption is often inaccurate. Therefore, the optimizer might rely on wrong cardinality information and therefore choose low quality execution plans. More complex queries (e.g., n-way joins) only exacerbate this problem, since estimation errors propagate themselves through the plans.

SUMMARY OF THE INVENTION

Statistics can be constructed on the results of join queries without executing the join by scanning one of the tables in the join and for each scanned tuple determining an approximate number of tuples in the other table that have a matching join attribute. A number of copies of the tuple corresponding to the multiplicity value are copied into a stream of tuples which is sampled on the fly to construct a statistical representation of the join result. Statistics can be constructed on the results of more complex queries by recursively performing the method, by applying filter conditions during the scan operation, and accessing multidimensional histograms to determine multiplicity values over joint distributions. To create multiple statistical representations on different user queries on the same database tables, the scans can be shared and intermediate results of scans stored temporarily for access later. An optimal order of table scans can be computed using adaptations of shortest common supersequence techniques.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENT

Exemplary Operating Environment

Figure 1:
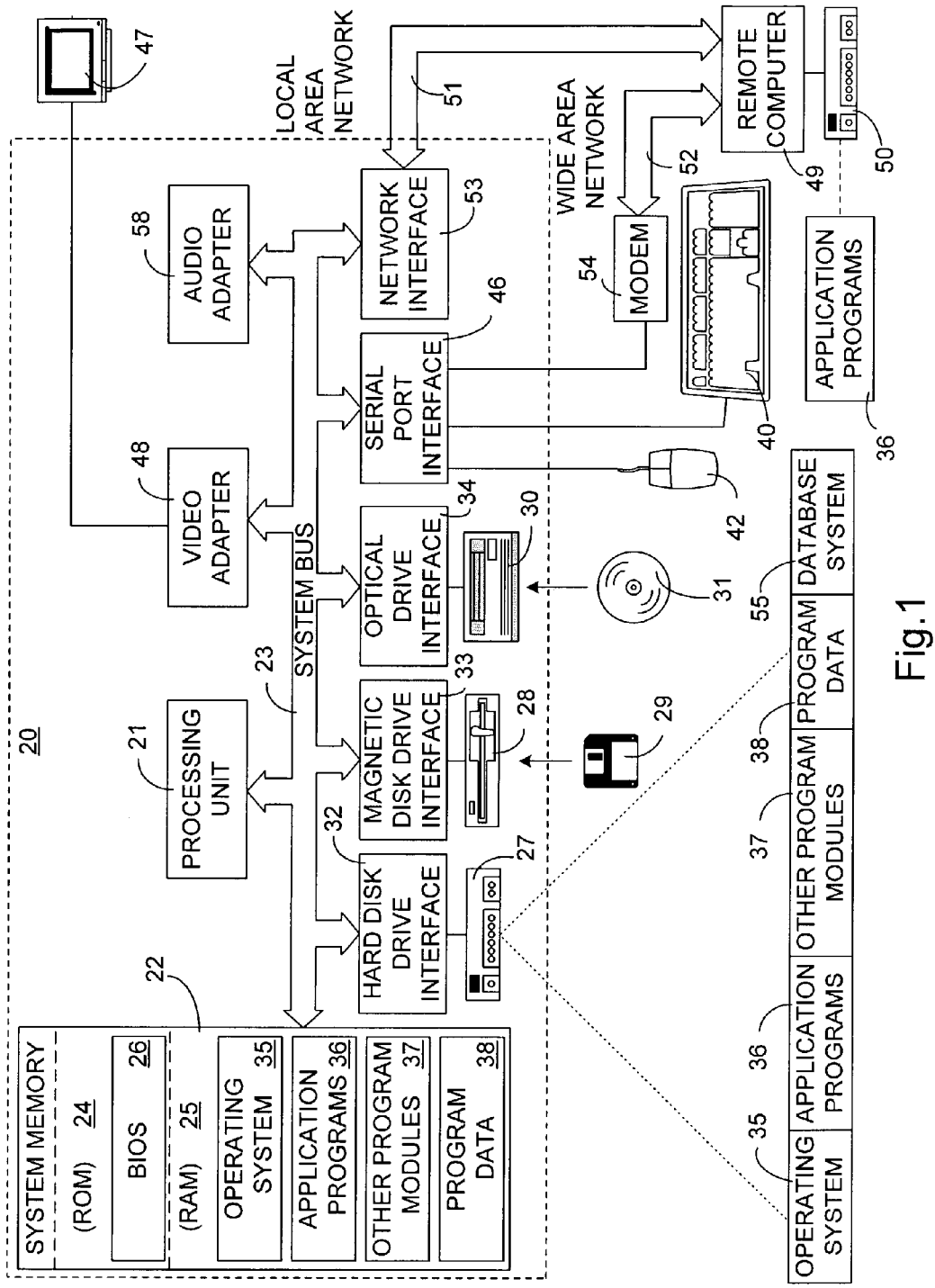
FIG. 1 illustrates an exemplary operating environment for a system for evaluating database queries using statistics maintained on intermediate query results.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Figure 3:
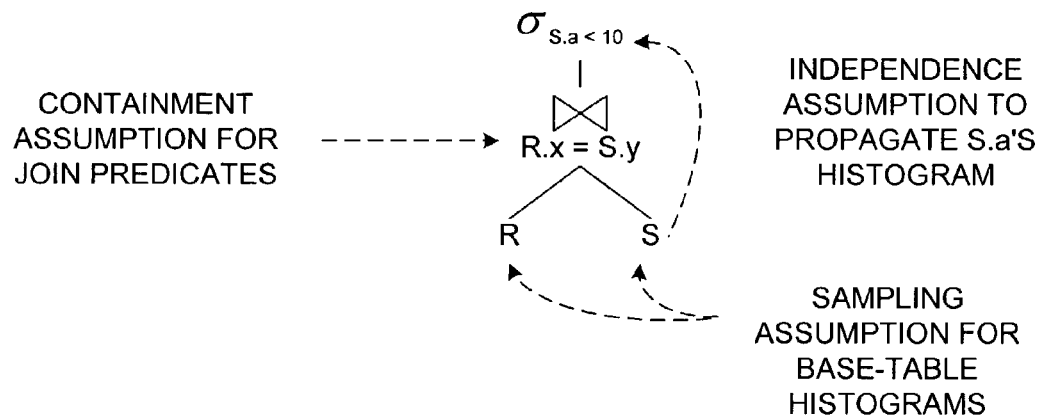
FIG. 3 is a join-graph representation of an execution sub-plan for a prior art query optimizer.

Cost Estimation Using Cardinality Estimates Based on Statistics on Intermediate Tables SITs (statistics on intermediate tables) are statistics built over the results of query expressions, and their purpose is to eliminate error propagation through query plan operators. As a simple example, consider again FIG. 3, and suppose that a histogram is built over the result of the query expression RS=R x=yS, specifically on RS.a. In this case the cardinality of the original query plan is estimated by simply estimating the cardinality of the equivalent plan σR.S.a<10 (RS), and thus avoid relying on the independence and containment assumptions.

For the purposes of this description, a SIT is defined as follows: Let R be a table, A an attribute of R, and Q an SQL query that contains R.A in the SELECT clause. SIT(R.A|Q) is the statistic for attribute A on the result of the executing query expression Q. Q is called the generating query expression of SIT (R.A|Q). This definition can be extended for multi-attribute statistics. Furthermore, the definition can be used as the basis for extending the CREATE STATISTICS statement in SQL where instead of specifying the table name of the query, more general query expression such as a table valued expression can be used.

In U.S. patent application Ser. No. 10/191,822, incorporated herein by reference in its entirety, the concept of SITs, statistics that are built over intermediate nodes in query execution plans, was introduced. A particular method of adapting a prior art query optimizer to access and utilize a preexisting set of SITs for cost estimation was described in detail in this application, which method is summarized here briefly as background information.

Figure 2:
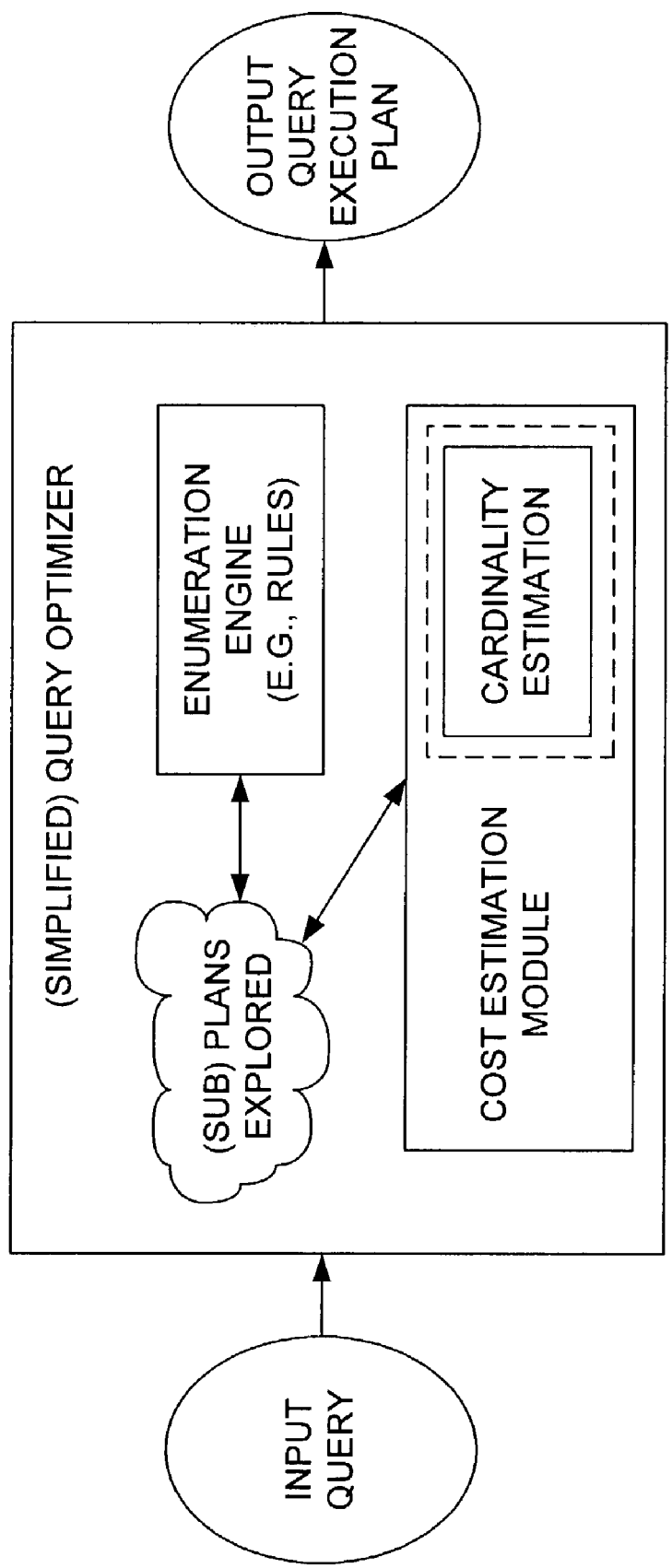
FIG. 2 is a block diagram of a prior art optimizer that can be used in conjunction with the present invention.

Referring to FIG. 2, the query optimizer examines an input query and generates a query execution plan that most efficiently returns the results sought by the query in terms of cost. The cost estimation module and its imbedded cardinality estimation module can be modified to utilize statistics on query expressions, or intermediate tables (these statistics will hereinafter be designated SITs) to improve the accuracy of cardinality estimates.

In general, the use of SITs is enabled by implementing a wrapper (shown in phantom in FIG. 2) on top of the original cardinality estimation module of the RDBMS. During the optimization of a single query, the wrapper will be called many times, once for each different query sub-plan enumerated by the optimizer. Each time the query optimizer invokes the modified cardinality estimation module with a query plan, this input plan is transformed by the wrapper into another one that exploits SITs. The cardinality estimation module uses the input plan to arrive at a potentially more accurate cardinality estimation that is returned to the query optimizer. The transformed query plan is thus a temporary structure used by the modified cardinality and is not used for query execution.

According to the embodiment described in application Ser. No. 10/191,822, the transformed plan that is passed to the cardinality estimation module exploits applicable SITs to enable a potentially more accurate cardinality estimate. The original cardinality estimation module requires little or no modification to accept the transformed plan as input. The transformation of plans is performed efficiently, which is important because the transformation will be used for several sub-plans for a single query optimization.

An Algorithm for Creating SITs

Although SITs can be defined using arbitrary generating queries, a technique for generating SITs will described herein in conjunction with join generating queries and in particular SPJ generating queries yielding SITs of the form $SIT(R_{k.a}|R_1 \bowtie \ldots \bowtie R_n)$. (Possible adaptations to the technique to enable it to handle more generalized queries will be described later.) For this class of generating query expressions, techniques inspired by the work done in approximate query processing can be leveraged to create SITs. In many cases approximate statistical distributions provide sufficient accuracy to enable efficient generation of SITs that provide a large improvement in cardinality estimation without the need to execute the underlying intermediate query expression. The technique for building approximate SITs for binary-join generating queries described herein, called Sweep, does not rely on the independence assumption, but does rely on the containment and sampling assumptions.

Figure 4:
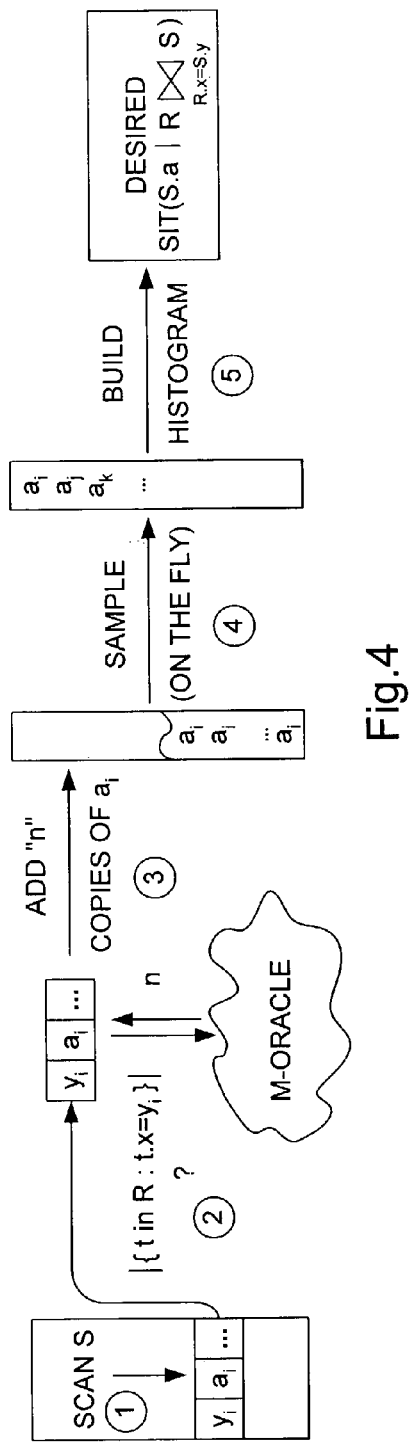
FIG. 4 is a block diagram of a technique for generating statistics on intermediate query expressions according to an embodiment of the present invention.

To create SIT(R.a|Q), Sweep attempts to efficiently generate a sample of $\pi_{R.a}(Q)$ without actually executing Q, and then use existing techniques for building histograms over this intermediate result. FIG. 4 is a block diagram illustration of Sweep as it creates a $SIT(S.a|R \bowtie_{x=y} S)$. In step 1, a sequential scan is performed over table S. If a multi-column covering index covering attributes {S.y,S.a} is available, a scan over that index can replace the sequential scan. For each tuple $(y_i,a_i)$ scanned from S, in step 2 the number of tuples r∈R such that $r.x=y_i$ is estimated. This value is denoted the multiplicity of tuple $y_i$ from table S in table R, and a procedure called m-Oracle is called to calculate the multiplicity value. The multiplicity of $y_i$ in R is the number of matches for tuple $(y_i,\alpha_i)$ in the join $R \bowtie_{x=y} S$. If the estimated number of matches for $y_i$ is n, n copies of $a_i$ are appended to a temporary table in step 3. The temporary table is not materialized, but is treated as a stream of values that approximate $\pi_{S.a}(R \bowtie_{x=y} S)$ In step 4 a one-pass sampling algorithm is applied to the streaming table, such as reservoir sampling. The result of this step is an approximated sample of $\pi_{S.a}(R \bowtie_{x=y} S)$, which is precisely the distribution for the desired SIT (step 5). Below is a more detailed explanation of m-Oracle, the technique used in Sweep to estimate multiplicities for arbitrary values $y_i$ from S in R.

In step 2 in FIG. 4 the multiplicity values of arbitrary tuples from S in R are obtained using m-Oracle. In the described embodiment, M-Oracle is implemented using a histogram based technique that results in accurate and efficient approximations of multiplicity values. Histograms over R.x and S.y (denoted $h_R$ and $h_S$) are used to provide the multiplicity of tuples form S in R. For a given value y from S, the buckets $b_{R.y}$ and $b_{S.y}$ are identified from histograms $h_R$ and $h_S$ that contain value y. The expected number of tuples from R that join with y is calculated under the containment assumption for join predicates.

To estimate the multiplicity of y in R two scenarios are considered. The number of distinct values in buckets $b_{R.y}$ and $b_{S.y}$ are denoted $dv_{R.y}$ and $dv_{S.y}$, respectively. In the case that $dv_{S.y} \leq dv_{R.y}$, i.e. the number of distinct values from $h_R$ is larger than that of $h_S$, under the containment assumption it can be guaranteed that value y, which belongs to one of the $dv_{S.y}$ groups in $b_{S.y}$, would match some of the $dv_{R.y}$ groups in $b_{R.y}$. Since it is assumed that a uniform distribution exists within the buckets, the multiplicity for y in this situation would by $f_{R.y}/dv_{R.y}$, where $f_{R.y}$ is the frequency of bucket $b_{R.y}$. However, if $dv_{S.y} > dv_{R.y}$, it can no longer be guaranteed that value y joins with some of the $dv_{R.y}$ buckets in $h_R$. If the tuples that verify the join are distributed uniformly, the probability that y is in one of the $dv_{R.y} < dv_{S.y}$ groups in $b_{R.y}$ that match some group in $b_{S.y}$ is $dv_{R.y}/dv_{S.y}$. In that case the multiplicity would be $f_{R.y}/dv_{R.y}$. Otherwise (y does not match with any value in R), the multiplicity would be 0. In conclusion, when $dv_{S.y} > dv_{R.y}$, the expected multiplicity of y in R is $(f_{R.y}/dv_{R.y}) \cdot (dv_{R.y}/dv_{S.y}) + 0 \cdot (1 - dv_{R.y}/dv_{S.y}) = f_{R.y}/dvS_{.y}$.

Putting both results together, the expected multiplicity of y from S in R is given by $f_{R.y}/\max(dv_{R.y}, dv_{S.y})$. Since the bucket that contains a given tuple can be located efficiently in main memory, this histogram based algorithm is extremely efficient.

The Sweep algorithm described above does not rely on an independence assumption to estimate cardinalities of SPJ queries, however it does rely on the containment assumption and sampling for building histograms. The Sweep algorithm can be modified so that it does not rely on these assumptions to obtain more accurate SITs, at the expense of introducing execution overhead to the algorithm. For example, if an index over attribute R.x is available, repeated index lookups can be issued to find exact multiplicity values rather than relying on the containment assumption to estimate multiplicity values in step 2 of FIG. 4. However, since index lookups are more expensive than histogram lookups, this modification incurs more cost. Additionally, to avoid error induced by sampling in step 4, the SIT may built directly from the temporary table. This may require materializing the temporary table on disk (and incurring additional expense), since it may be too large to fit in main memory. By combining index lookups and direct access to the temporary table, an accurate SIT histogram can be obtained but at a significant cost penalty. The basic Sweep algorithm outlined in FIG. 4 will be the focus of the remainder of this description.

Sweep, as already discussed in conjunction with binary-join generating queries, can be extended to handle acyclic-join queries. A given query is an acyclic join query if its corresponding join-graph is acyclic. This description will discuss a restricted class of acyclic join queries in which for every pair of tables $t_1$ and $t_2$ in the generating query q, there is at most one predicate in q joining $t_1$ and $t_2$. The more general case e.g., for $R \triangleright \triangleleft_{R.w=S.x \wedge R.y=S.x} S$, the technique can be extended using multidimensional histograms.

A linear-join query can be expressed as $(R_1 \triangleright \triangleleft, \ldots, \triangleright \triangleleft R_n)$, where the i-th join ($1 \leq i \leq n-1$) connects tables $R_i$ and $R_{i+1}$, i.e., the corresponding join-graph is a chain. Based on the description for Sweep above, to approximate $SIT(S.a|R \triangleright \triangleleft_{x=y} S)$ the following operations must be performed: (i) a sequential (or index) scan covering attributes {S.y, S.a} in table S, and (ii) histogram lookups over attributes R.x and S.y. To approximate a SIT over a linear-join query, the query joins are left-associated and the original SIT is unfolded into a set of single-join SITs as illustrated in FIG. 5.

Figure 5:
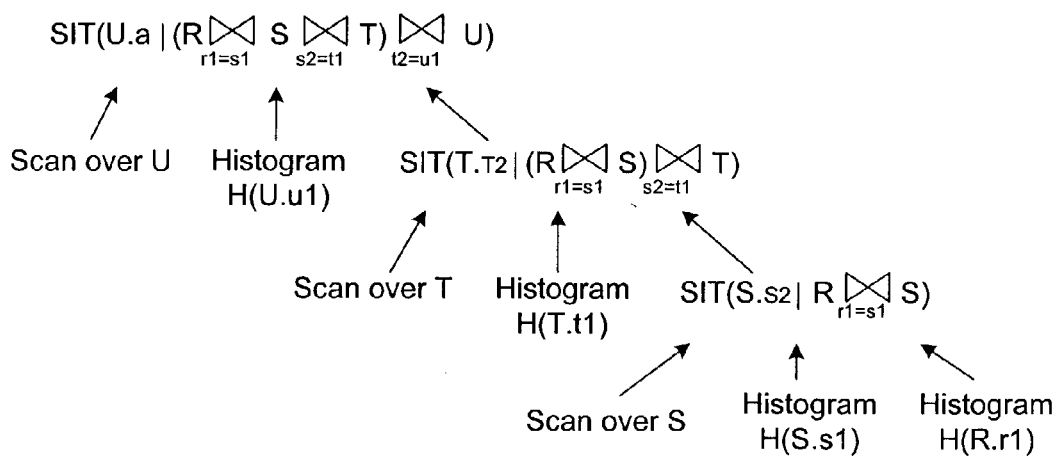
FIG. 5 illustrates a procedure to obtain statistics on intermediate query expressions according to the technique of FIG. 4.

FIG. 5 shows $SIT(U.a|R \triangleright \triangleleft_{r1=s1} S \triangleright \triangleleft_{s2=t1} T \triangleright \triangleleft_{t2=u1} U)$. This SIT can be rewritten as $SIT(U.a|RST \triangleright \triangleleft_{t2=u1} U)$, where RST is defined as $R \triangleright \triangleleft_{r1=s1} S \triangleright \triangleleft_{s2=t1} T$. To approximate this equivalent SIT, a sequential scan is performed over table U, and histograms over $U.u_1$ and $RST.t_2$ are accessed. However, $RST.t_2$ can be rewritten as $SIT(T.t2|R \triangleright \triangleleft_{r1=s1} S \triangleright \triangleleft_{s2=t1} T)$ to create the original SIT, which requires a second application of Sweep. The base case corresponds to approximating $SIT(S.s2|R \triangleright \triangleleft_{r1=s1} S)$, since both join operands are base tables, and Sweep works for this case as shown in FIG. 5.

Figure 6:
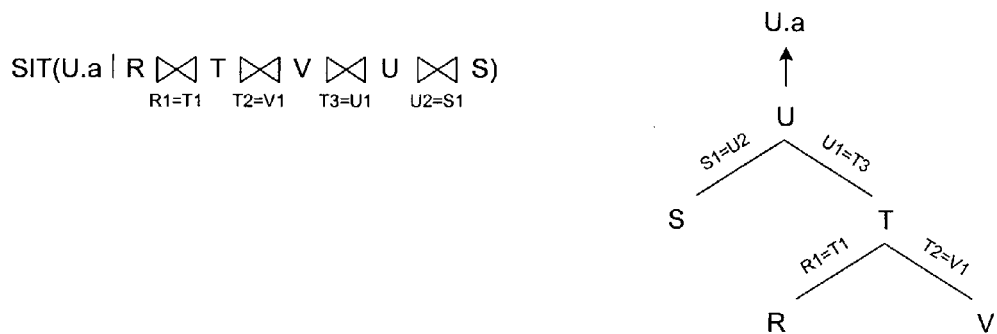
FIG. 6 is a join-graph representation of an acyclic join query that is used in an example of the technique of FIG. 4.

To extend Sweep to handle more general kinds of acyclic-join generating queries, an acyclic join-graph is converted into a join-tree that has at the root the table holding the SIT's attribute. FIG. 6 shows an example of a SIT with an acyclic-join generating query and its induced join-tree. If the height of the join-tree is one (the join-tree consists of a root R and children $S_1, \ldots, S_n$), to get $SIT(R.a|R \triangleright \triangleleft_{R.r1=S.s1} S_1 \triangleright \triangleleft_{R.r2=S.s2} S_2 \triangleright \triangleleft \ldots \triangleright \triangleleft_{R.rn=S.sn} Sn)$, a base-table histogram is first built for each attribute $S_i.s_i$. As with the single-join case, a sequential scan is then performed over R. To obtain the multiplicity of tuple $r=(a, r_1, \ldots, r_n)$ from R in the multi-way join, each partial multiplicity of $r_i$ in $S_i$ (denoted $m_i$) is obtained. The partial multiplicities are then multiplied. The multiplicity of tuple r from R in the join is then $\Pi_i(m_i)$. This multiplicity value does not assume independence between join predicates. Each tuple r from R joins with $m_i$ tuples from each $S_i$, and since the join-graph is acyclic, the result contains all possible join combinations between r and each qualifying tuple in $S_i$. After obtaining the multiplicity values, Sweep may proceed as described above.

For an arbitrary acyclic-join generating query the join-tree is traversed in post-order. At each leaf node a base-table histogram is built for the attribute that participates in the join with the parent table in the join-tree. For each internal node, the children's SITs produce earlier are used to compute the corresponding SIT for the attribute that participates in the join predicate with the parent (or the final attribute for the root node). As an example, for the SIT depicted in FIG. 6, the base table histograms for S.s1, R.r1, and V.v1 are generated. When processing node T, $SIT(T.t3|R \triangleright \triangleleft_{r1=t1} T \triangleright \triangleleft_{t2=v1} V)$ is calculated by performing a sequential scan over table T and using histograms over R.r1 and T.t1, and over V.v1 and T.t2. When processing node U, the desired SIT $(U.a|R \triangleright \triangleleft_{r1=t1} T \triangleright \triangleleft_{t2=v1} V \triangleright \triangleleft_{t3=u1} U \triangleright \triangleleft_{u2=s1} S)$ is calculated using a sequential scan over table U, a histogram over S.s1, and the SIT produced at node T.

As described, Sweep can be used to create SITs with arbitrary acyclic-join generating queries. Sweep requires a sequential scan over each involved table (except for the root of the join-tree) and some additional amount of extra processing to build intermediate SITs. Sweep can be extended to cover more complex scenarios by materializing some portions of the generating query first and then applying the Sweep algorithm to the materialized portions.

Extensions to More General Queries

Sweep can be extended to handle generating queries with selection predicates. Given $SIT(S.a|\sigma_{S.b<5}(R \triangleright \triangleleft S))$, since the selection predicate S.b<5 is on table S, tuples that satisfy S.b<5 can be filtered during the scan of table S. If a clustered index over S.b is available, it can be used to improve execution time. In general for more complex queries this filtering approach can be used as well. To obtain $SIT(R.a|\sigma_{S.b=2 \wedge R.c<5}((R \triangleright \triangleleft_{w=x} S) \triangleright \triangleleft_{y=z} T))$, a sequential scan over table R (keeping tuples that satisfy R.c<5) is performed and $SIT(R.w|\sigma_{R.c<5}(R))$ and $SIT(S.x|\sigma_{S.b=2}(S \triangleright \triangleleft_{y=z} T))$ are manipulated. The former SIT can be created by using an additional scan (or a sample) over table R. The latter is recursively obtained with a sequential scan over S (keeping tuples satisfying S.b=2) and manipulating $SIT(S.y|S.b=2)$ and base-table histogram H(T.z). If the filter predicate is defined over a table that is not scanned during Sweep, the corresponding SIT may be obtained by exploiting multidimensional histograms. For example, to obtain $SIT(S.a|\sigma_{R.b<10}(R \triangleright \triangleleft_{x=y} S))$ a sequential scan is performed over S and multiplicity values are determined using a histogram over S.y and a two-dimensional histogram over {R.b,R.x}.

Sweep can also be extended to generate multidimensional SITs in which all the attributes are over the same base table. For instance, to create $SIT(S.a,S.b|R \triangleright \triangleleft_{x=y} S)$, a scan over the joint distribution (S.a,S.b,S.y) is performed first. Then, multiplicity values are obtained and a temporary table approximating $\pi_{S.a, S.b}(R \triangleright \triangleleft_{x=y} S)$ is created and sampled. Finally, a traditional multidimensional technique is used to materialize the SIT over the approximate sample. This technique requires more space for samples because each element in the sample is a multidimensional tuple.

Multiple SIT Creation

In many instances it will be useful to create several SITs at once. Given a set of candidate SITs that would be useful for a workload, many commonalities between the SITs might exist so that the sequential scans required to build the SITs could be "shared". For this reason, a one-at-a-time approach to building SITS will likely be suboptimal such as in this example.

Two SITs are to be created:

$SIT(T.a|R \triangleright \triangleleft_{r1=s1} S \triangleright \triangleleft_{s3=t3} T)$ and $SIT(S.b|R \triangleright \triangleleft_{r2=s2} S)$ A naïve approach would be to apply Sweep to each SIT separately. In that case, one sequential scan would be used over tables S and T to build the first SIT and a second sequential scan over table S would be used to build the second SIT. However, the sequential scans can be ordered so that a single scan of table S can be used for both SITs. A sequential scan over table S can be performed to get both $SIT(S.b|R \triangleright \triangleleft_{r2=s2} S)$ and $SIT(S.s3|R \triangleright \triangleleft_{r1=s1} S)$. This can be done by sharing the sequential scan over S (on attributes S.s2, S.b, S.s3, and S.s1) and using histograms over R.r2 and S.s2 for the first SIT, and histograms R.r1 and S.s1 for the second SIT to obtain the required multiplicity values. A sequential scan over T can be then performed and the previously calculated $SIT(S.s3|R \triangleright \triangleleft_{r1=s1} S)$ can be used to obtain the required $SIT(T.a|R \triangleright \triangleleft_{r1=s1} S \triangleright \triangleleft_{s3=t3} T)$. This strategy requires a single sequential scan over table S, as opposed to two scans for the naïve strategy. Of course, the memory requirements for the second strategy are larger than those for the first, since it is necessary to maintain two sets of samples in memory: one for $\pi_{S.b}(R \triangleright \triangleleft_{r2=s2} S)$, and another for $\pi_{S.s1}(R \triangleright \triangleleft_{r1=s1} S)$.

The following optimization problem can be used to create a given set of SITs. Given a set of SITs $S=\{S_1, \ldots, S_n\}$ a sampling rate s (specified as a percentage of table size, an absolute amount, or a combination of both), and the amount of available memory M, find the optimal sequence of applications of the Sweep algorithm (sharing sequential scans as explained above) such that (i) at any time the total amount of memory used for sampling is bounded by M, and (ii) the estimated execution cost for building S is minimized.

The Shortest Common Supersequence (SCS) problem, used in text editing, data compression, and robot assembly lines can be adapted to address this optimization problem as follows. $R=x_1, \ldots, x_n$ is a sequence of elements (individual elements of R can be accessed using array notation, so $R[i]=x_i$). Given a pair of sequences R and R', R' is a subsequence of R, if R' can be obtained by deleting zero or more elements form R (R is said to be a supersequence of R'). A sequence R is a common supersequence of a set of sequences $\mathcal{R}=\{R, \ldots, R_n\}$ if R is a supersequence of all $R_i \in \mathcal{R}$. A shortest common supersequence of $\mathcal{R}$, denoted $SCS(\mathcal{R})$, is a common supersequence of $\mathcal{R}$ with minimal length.

For example, $\mathcal{R}=\{abdc,bca\}$ has supersequences abdcbca, aabbddccbbcaa, and abdca. $SCR(\mathcal{R})=abdca$, since no sequence of size four is common supersequence of both abdc and bca.

Finding the SCS of a set of sequences in an NP-complete problem that can be solved using dynamic programming in $\mathcal{O}(l^n)$ for n sequences of length at most l, by formulating SCS as a shortest path problem in an acyclic directed graph with $\mathcal{O}(l^n)$ nodes. For a given set of sequences $R=\{R_1, \ldots, R_n\}$, the graph is constructed as follows. Each node in the graph is a n-tuple $(r_1, \ldots, r_n)$, where $r_i \in \{0 \ldots |R_i|\}$ indexes a position $R_i$. Node $(r_1, \ldots, r_n)$ will encode a solution for the common supersequence of $\{S_1, \ldots, S_n\}$ where $S_i=R_i[1]R_i[2]\ldots, R_i[r_i]$, i.e., the $r_i$-prefix of $R_i$. An edge is inserted from node $(u_1, \ldots, u_n)$ to node $(v_1, \ldots, v_n)$ with label θ if the following properties hold: (i) $u_i=v_i \wedge u_i+1=v_i$, (ii) at least one position $u_j$ verifies $u_j+1=v_j$, and (iii) for every position $v_j$ such that $u_j+1=v_j$, $R_j[v_j]=\theta$. Informally, an edge labeled θ connects nodes u and v if the state represented by v can be reached from the state represented by u by adding θ to the common supersequence encoded at u.

Any path from node $O=(0, \ldots, 0)$ to node $F=(|R_1|, \ldots, |R_n|)$ in the graph corresponds to a common supersequence of R. In particular, any shortest path from O to F corresponds to a shortest common supersequence of R. Therefore, to solve SCS the induced graph is materialized and any algorithm may be used to find the shortest path between O and F.

Figure 7:
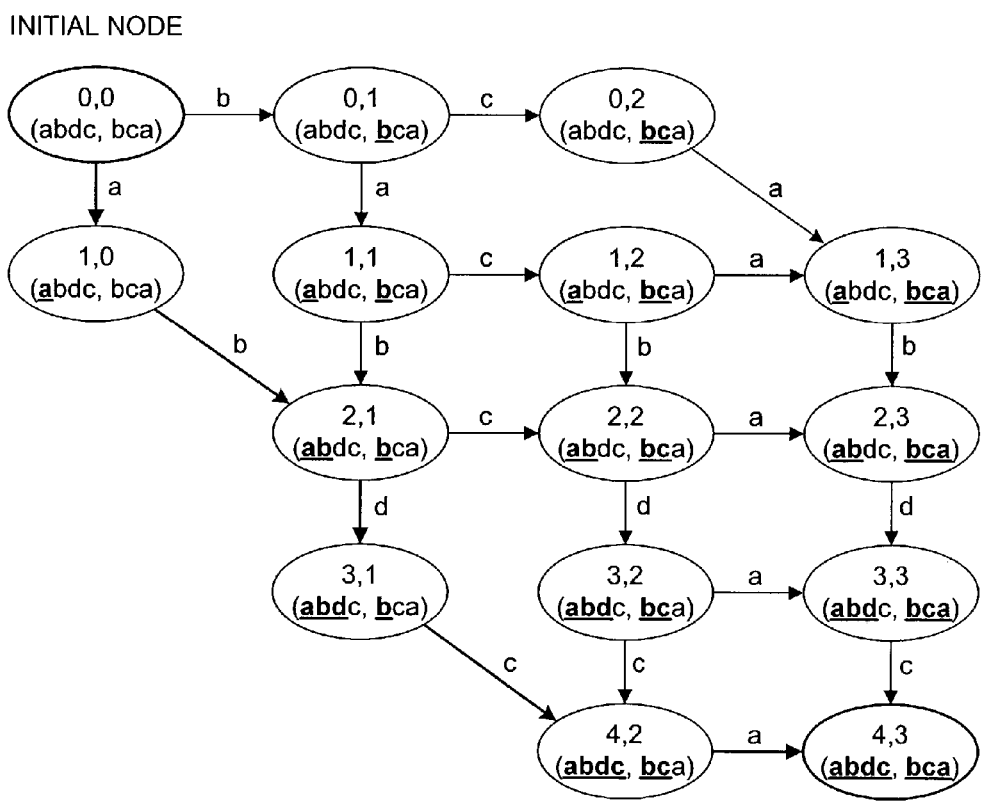
FIG. 7 is a graph induced by a set of sequences used to illustrate a technique for generating statistics on multiple intermediate query expressions.

FIG. 7 shows the graph induced by the set of sequences $R=\{abdc,bca\}$. For instance, (2,1) is the final node for the sub problem $\mathcal{R}'=\{ab,b\}$ (the 2- and 1-prefixes of the original sequences, respectively). By adding an edge c to any common supersequence of {ab,b} the common supersequences for {ab,bc} are obtained and the edge c is inserted between nodes (2,1) and (2,2). The shortest path from the initial node $O=(0,0)$ to the final node $F=(4,3)$ is $\{(0,0),(1,0),(2,1),(3,1), (4,2),(4,3)\}$, which corresponds to $SCS(\mathcal{R})=abdca$. It is possible to solve SCS without materializing the whole induced graph in advance by adapting an algorithm known as A*.

Algorithm A* is a heuristic technique to efficiently find shortest paths in graphs that are inductively built (i.e., graphs in which the set of successors of any given node can be generated). A* is applied to the SCS problem so that only a portion of the graph induced by the input set of sequences is materialized at any given time. A* searches the input graph outwards from the starting node O until it reaches the goal node F, expanding at each iteration the node that has the most chances to be along the best path from O to F. The application of A* is based on the possibility, for each node u in the induced graph, of estimating a lower bound of the length of the best path connecting O and F through u (denoted f(u)). At each step in the search, the most promising node is chosen, i.e., the node for which f(u) is the smallest among those for the nodes created so far. Then the chosen node is expanded by dynamically generating all its successors in the graph. Typically, the cost function f(u) is composed of two components, $f(u)=g(u)+h(u)$, where g(u) is the length of the shortest path found so far between O and u, and h(u) is the expected remaining cost (heuristically determined) to get from u to F. If the heuristic function h(u) is always an underestimate of the actual length from u to F, A* is guaranteed to find the optimal solution. However, if h(u) is too optimistic, A* will expand too many nodes and may run out of resources before a solution is found. Therefore, it is important to define h(u) as tight as possible. Also, if for any pair of nodes u and v that are connected by an edge in the graph, $h(u)-h(v) \leq d(u,v)$ where d(u,v) is the cost of going from u to v, the following property holds: whenever a node u is expanded, a shortest path from O to u is already known. This property allows efficient implementations of A*.

For the SCS problem, an estimate on the length of the shortest path from u to F, i.e., h(u), equivalent to an estimate of the shortest common supersequence of the suffixes of the original sequences not yet processed in state u. A good value for h(u) can then be calculated as follows. Given a maximum number of occurrences of c in some suffix sequence u (denoted o(u,c)), a lower bound h(u) is then o(u,c), since every common supersequence must contain at least o(u,c) occurrences of c. For instance, referring to node (2,1) in FIG. 7, two first elements of abdc were processed and the first element of bca was also processed. The remaining suffixes are dc and ca, respectively. In this case, h((dc,ca), a)=o((dc, ca),d)+o((dc,ca),c)+o((dc,ca),a)=1+1+1=3. The following A* algorithm can be used to solve SCS.

```
01  OPEN={O}; CLOSED=Ø; g(O)=0; f(O)=0;
02  REPEAT
03      bestN=n ∈ OPEN such that f(n) is minimal
04      OPEN=OPEN − {bestN}
05      CLOSE=CLOSE ∪ {bestN}
06      gNew=g(bestN) + 1  //d(bestN,s)==1
07      for each successor s of bestN do
08          if (s ∉OPEN ∪ CLOSE) ∨ (s ∈ OPEN ∧ gNew < g(s)) )
09              g(s)=gNew; h(s) = Σ_c o(u, c); f(s)=g(s) + h(s)
10              OPEN=OPEN ∪ {s}
11  until (bestN=F)
```

A* does not affect the size of the graph, but usually results in faster executions since it does not need to generate the whole graph in advance, but only explores a small fraction guided by the heuristic function h.

The A* technique can be adapted to optimally create a set of SITs. As already discussed, creating a SIT requires performing sequential scans over the set of tables referenced in the SIT's generating query (with the exception of the root table in the join tree). Moreover, the sequential scans must follow the order given by some post-order traversal of the join tree. For example, to create a SIT over attribute R.a with the acyclic-join generating query of FIG. 8(b) sequential scans over tables S and U (which return SIT(S.s1|S⊳◁$_{s2=t1}$T) and SIT(U.u1|U⊳◁$_{u2=v1}$V)) must precede the sequential scan over table R, since the latter uses SITs produced by the former. However, no ordering is required between scans of S and U.

Figure 8:
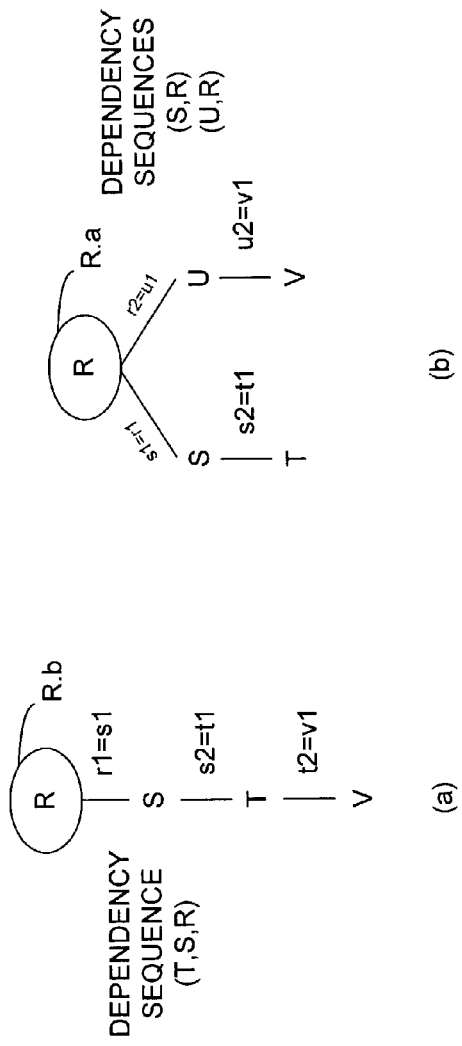
FIG. 8 illustrates dependency sequences of the technique of FIG. 7.

These order restrictions can be concisely specified by using a set of dependency sequences. A dependency sequence is a sequence of tables $(R_1, \ldots, R_n)$, such that for all $1 \le i,j \le n$, the sequential scan over table $R_i$ must precede the sequential scan over $R_j$. For linear-join queries, a single dependency sequence is needed, which is obtained by traversing the chain of joins starting from the table that originally hosts the SIT's attribute, and omitting the last table. In general, for an acyclic-join query one dependency sequence is needed for each root-to-leaf path in the join-tree (omitting leaf nodes). FIG. 8 shows two join queries and their corresponding dependency sequences.

To model the time and space required to execute Sweep over a single-join generating query, the following values are associated with each table T: Cost(T) which is the estimated cost to perform a sequential scan over T, and SampleSize (T,a), which specifies how much memory is allocated for a sample over attribute a of T. SampleSize(T,a) can be a constant value or depend on the specific table and attribute. Therefore, if Sweep is used to create SIT(S.a|R⊳◁S), the cost of the procedure is estimated as Cost(S) and the memory requirements are estimated as SampleSize(S,a).

As illustrated above, the sequential scan over table S can be shared to create any SIT of the form SIT(S.a|R⊳◁$_{x=y}$,S) for arbitrary table R and attributes a, x, and y, provided there are histograms over R.x and S.y available. Note that for acyclic-join generating queries, R could represent an intermediate join result. In this situation the cost of executing Sweep remains fixed at Cost(T) since the sequential scan is shared. However, the space required for sampling increases to $\Sigma_i$sampleSets($a_i$)·SampleSize(T,a), where samplesets($a_i$) is the number of sample sets for attribute $a_i$ required during the sequential scan over table S. For instance, if the sequential scan over S is shared to create sit (S.a|R⊳◁$_{x=y}$,S), SIT(S.b|R⊳◁$_{x=y}$S), and SIT(S.a|T⊳ ◁$_{z=y}$S), the estimated cost will be Cost(S) and the memory requirements for sampling will be 2·SampleSize(S,a)+SampleSize(S,b).

If the amount of available memory is unbounded, the optimization problem can be mapped to a weighted version of SCS, where the input sequences to the SCS problem are all the dependency sequences of the given SITs. In this case, the A* algorithm is changed only to the extent that the definition of the distance function between nodes must incorporate weights and the heuristic function h(u) must also be modified (lines 6 and 9 in the A* algorithm). In particular, d(bestN,s) is given a weight of Cost(R) where R is the label of edge (bestN,s). The definition of h(u) is changed accordingly and the second assignment of line 9 becomes h(s)=$\Sigma_c$Cost(c)·o(u,c).

Given the SCS, the elements (tables) of the SCS are iterated through, one at a time. When a table T is processed, all SITs of the form SIT(T.a|S⊳◁$_{si=tj}$T) are created (using Sweep) for which the histogram of S.si is already built (or if S is a base table, the corresponding base-table histogram is created first).

Referring to FIG. 8 and assuming that Cost(R)=Cost(S)=10, Cost(T)=Cost(U)=Cost(V)=20, and SampleSize(t,a)=10,000 for all tables and attributes, a shortest weighted common supersequence is sought. In such a case, a shortest weighted common supersequence with a cost of 60 is (U,T,S,R). The execution of schedule (U,T,S,R) proceeds as follows. A sequential scan is performed over table U to obtain Sit(U.u1|U⊳◁$_{u2=v1}$V). Then with a sequential scan over T, SIT(T.t1|T⊳◁$_{t2=v1}$V) is obtained. A sequential scan over S is then performed to obtain SIT(S.s1|S⊳◁$_{s2=t1}$T) and SIT(S.s1|S⊳◁$_{s2=t1}$T⊳◁$_{t2=v1}$V) (using 2·SampleSize(S,$s_1$) memory for samples). Finally a sequential scan is performed over table R and, using SampleSize(R,a)+SampleSize(R,b) for samples, the required SIT(R.b|R⊳◁$_{r1=s1}$S⊳◁$_{s2=t2}$T⊳◁$_{t2=v1}$V) and SIT(R.a|R⊳◁$_{r1=S1}$S⊳◁$_{s2=t1}$T⊳◁$_{t2=u1}$U⊳◁$_{u2=v1}$V) are obtained.

The scenario considered above assumes that any amount of memory can be allocated to create SITs. When the amount of memory M is bounded, the search space is modified to solve a constrained, weighted SCS. For instance if 2·SampleSize(S,s1)>M, the sequential scan over S could not be shared, and the optimal execution path would be different as described below.

Multiple SIT Creation With Bounded Memory

If the amount of available memory is bounded, some edges in A*'s search graph are no longer valid. This is because the implicit meaning of an edge from node u=$(u_1, \ldots, u_n)$ to node v=$(v_1, \ldots, v_n)$ with label θ is to "advance" one position all input sequences for which R[$u_i$]=θ. While creating SITs, each position that was changed from $u_i$ to $v_i=u_i+1$ in transition (u,v) corresponds to an additional SIT to create and therefore may increase the memory requirements above the given limit. When memory is limited, only subsets of all possible positions from node u using edge θ can be advanced. To ensure optimality, each possible position must be tried. To deal with a bounded memory, successors of a given node are determined at each iteration of A* as outlined in pseudo code below.

```
generateSuccessors (u = u₁, . . . ,uₙ):
node, R = {R₁, . . . ,Rₙ}: sequences, M: memory limit)
01      successors = Ø
02      for each table T in R do
03          cand = {i: Rᵢ[uᵢ] = T}
04          for each C ⊆ cand such that Σₐᵢ
                sampleSets(aᵢ) · SampleSize(T, aᵢ) ≤ M do
05              successors = successors ∪ (v₁, . . . ,vₙ);
                where vᵢ = uᵢ+1 if i ∈ C, uᵢ otherwise
06      return successors
```

The size of the search graph is bounded by $O(l^n)$, where n is the number of input SITs and l is the size of the largest dependency sequence among the input SITs. The A* algorithm is guaranteed to find an optimal scheduling. However, if there are many input SITs, or SITs with many joins, the A*-based technique may become expensive due to the increase in the number of edges to be evaluated. The worst-case time complexity of the algorithm is $O(l^n \cdot 2^S)$ where l is the maximum length of any chain of joins, n is roughly the number of input SITs, and S is the maximum size of any candidate set. For small values of l and n, the A* algorithm is efficient, but larger values of l or n can cause executions of A* to become prohibitively expensive. The A* algorithm can be modified in a manner that balances efficiency and quality of the resulting schedule.

A simple modification is to take a greedy approach. At each iteration of A*, after the best node u is selected, the OPEN set is emptied before adding the successors of u. In this way, the greedy approach chooses at each step the element that would result in the largest local improvement. In this case, the size of OPEN at each iteration is bounded by the maximal number of successors of any given node, and the algorithm is guaranteed to finish in at most $\Sigma_i|R_i|$ steps (since the induced search graph is always acyclic). However, due to the aggressive pruning in the search space, the greedy approach when used exclusively may result in suboptimal schedules.

A hybrid approach that combines A* and the greedy method above switches from A* to the greedy approach when appropriate by cleaning OPEN at the current and every subsequent iteration. The hybrid approach starts as A* and after a switch condition, greedily continues from the most promising node found so far. Several switching conditions can be used for the hybrid approach. The switch can be made after a pre-determined amount of time has passed without A* returning the optimal solution, or after |OPEN ∪ CLOSE| uses all available memory. In one particular hybrid approach, the switch is made after one second of time without A* finding an optimal solution.

It can be seen from the foregoing description that building and maintaining statistical information on intermediate query results can result in more efficient query plans. Although the present invention has been described with a degree of particularity, it is the intent that the invention include all modifications and alterations from the disclosed design falling within the spirit or scope of the appended claims.

We claim:

1. In a relational database having records in the form of tables of tuples stored therein, a method for compiling a statistical representation of an attribute for tuples that verify a user query wherein the user query comprises a join predicate that joins first and second database tables on a join attribute, the method comprising the steps of:
   scanning the tuples contained in the second database table;
   for each scanned tuple, determining a statistical multiplicity value based on a number of tuples from the first database table that have a matching join attribute with respect to the scanned tuple;
   adding a number of copies of the scanned tuple to a stream of tuples wherein the number of copies added corresponds to the statistical multiplicity value determined for the scanned tuple;
   sampling the stream of tuples to compile a statistical representation for values of the attribute in the sampled tuples; and
   storing the statistical representation in at least one memory,
   wherein determining the statistical multiplicity value is performed by accessing statistical information about the first and second tables and based on the statistical information determining a number of tuples in the first table that have a matching join attribute value to the scanned tuple, and
   wherein the statistical information comprises a first histogram on the first table that has a first bucket containing the join attribute value of the scanned tuple and a second histogram on the second table that has a second bucket containing the join attribute value of the scanned tuple, wherein each bucket has a frequency and a number of distinct values contained in the bucket, and wherein the statistical multiplicity value is calculated as the frequency of the join attribute in the first table divided by a maximum of the number of distinct values in the first bucket and the number of distinct values in the second bucket.

2. The method of claim 1 wherein the step of scanning the tuples is performed by sequentially scanning the table.

3. The method of claim 1 wherein the step of sampling the stream of tuples is performed by randomly sampling the stream of tuples.

4. The method of claim 1 wherein the step of sampling the stream of tuples is performed by reservoir sampling.

5. The method of claim 1 wherein the step of scanning the tuples is performed using an index on the second table that covers the attribute and the join attribute.

6. The method of claim 1 wherein the query comprises predicate that joins a number n tables in n−1 linear joins, the method comprising the steps of:
   compiling a statistical representation for a first two of the n tables according to the method of claim 1;
   iteratively performing the method of claim 1 by:
      accessing the statistical representation from the previous performance of the method;
      scanning a next joined table that has not yet been scanned;
      during each scan determining statistical multiplicity values based on the statistical representation for the previous performance of the method; and wherein the resulting statistical representation becomes the statistical representation for a next iterative performance of the method; and returning the resulting statistical representation to the memory after all tables have been processed.

7. The method of claim 1 wherein the user query comprises an acyclic-join generating query that induces a join-tree having a root and nodes and wherein each node represents a table and each edge represents a join between a parent table and a child table, comprising the steps of:

performing a post-order traversal of the join-tree, and at each internal node in the join-tree:
obtaining statistical information about each child table;
performing the method of claim 1 with respect to each child table connected to the parent at the node by scanning the parent table and using the obtained statistical information about the child table to determine a partial multiplicity for the parent table and each child table;
multiplying the partial multiplicities obtained for the child tables at the node and using the product of the partial multiplicities to construct a statistical representation for the parent table; and
returning the statistical representation obtained at the root of the join-tree.

8. The method of claim 1 wherein a plurality of statistical representations for attributes in tuples that verify a plurality of queries is sought, wherein each query comprises a join predicate, the method comprising:

for each query, generating a list of table scans that are necessary to compile the statistical representation for that query;
finding a shortest common supersequence with respect to the lists of table scans to determine a scan order for the tables;
scanning the tuples in each table according to the scan order and for each table:
according to the method of claim 1, determining and storing a partial statistical representation for the table for each query in which the table is referenced; and
accessing the partial statistical representations to construct statistical representations for each of the plurality of queries according to the method of claim 1.

9. The method of claim 7 wherein the step of finding the shortest common supersequence is performed by:
constructing an acyclic directed graph by:
determining an initial node;
expanding the initial node by adding edges each corresponding to one of the tables in the list of table scans and connecting a new node to each edge wherein the new node corresponds to a list of all edges traversed to arrive at the node; and
expanding each new node until a final node is reached that corresponds to the list of table scans to be performed; and
finding a shortest path along the graph from the initial to the final node; and
wherein the shortest path is the shortest common supersequence of tables to be scanned.

10. The method of claim 9 wherein the step of expanding each new node is performed by adding new nodes based on the likelihood that the node will be on the shortest path.

11. The method of claim 10 wherein the likelihood that the node will be on the shortest path is based on an estimate of the shortest common supersequence of suffixes of the shortest common supersequence of tables to be scanned that have not yet been processed.

12. The method of claim 9 wherein the step of expanding each new node is performed based on dependency sequences that specify an order in which tables must be scanned.

13. The method of claim 9 wherein the step of expanding each new node comprises the step of associating a cost with each added edge that represents a cost for scanning the table corresponding to the edge and wherein the step of finding the shortest path is performed by finding the path with the lowest cost.

14. The method of claim 13 wherein the step of expanding each new node is performed by evaluating all possible nodes that may result from expansion and choosing at least one of the possible nodes for expansion based on the cost of the edge required to reach the node.

15. The method of claim 14 wherein only the possible node with the lowest cost is expanded.

16. The method of claim 1 wherein the query comprises a selection predicate having a selection criteria and wherein only tuples detected during scanning that meet the selection criteria are processed in the step of determining a statistical multiplicity value.

17. The method of claim 1 wherein the statistical information comprises a multidimensional histogram.

18. The method of claim 1 wherein a statistical representation for a plurality of attributes is compiled by scanning a joint distribution of the plurality of attributes and determining a statistical multiplicity for the scanned tuples.

19. In a relational database having records in the form of tables of tuples stored therein, a method for compiling a histogram of an attribute for tuples that verify a user query wherein the user query comprises a join predicate that joins a number n tables, including first and second tables, in n−1 linear joins, the method comprising the steps of:

scanning the tuples contained in the second database table;
for each scanned tuple, accessing statistical information about the first and second tables to determine a statistical multiplicity value based on a number of tuples from the first database table that have a matching join attribute with respect to the scanned tuple;
adding a number of copies of the scanned tuple to a stream of tuples wherein the number of copies added corresponds to the statistical multiplicity value determined for the scanned tuple;
sampling the stream of tuples to compile a histogram for values of the attribute in the sampled tuples; and
storing the histogram in at least one memory,
wherein the statistical information comprises a first histogram on the first table that has a first bucket containing the join attribute value of the scanned tuple and a second histogram on the second table that has a second bucket containing the join attribute value of the scanned tuple, wherein each bucket has a frequency and a number of distinct values contained in the bucket, and wherein the statistical multiplicity value is calculated as the frequency of the join attribute in the first table divided by a maximum of the number of distinct values in the first bucket and the number of distinct values in the second bucket; and
iteratively processing the remaining joined tables by:
scanning a next joined table that has not yet been scanned;
during each scan determining statistical multiplicity values based on the previously obtained histogram;
adding a number of copies of the scanned tuple to a stream of tuples wherein the number of copies added corresponds to the statistical multiplicity value determined for the scanned tuple;

sampling the stream of tuples to compile a histogram for values of the attribute in the sampled tuples;

wherein the resulting histogram becomes the histogram for a next iterative performance of the method; and returning the resulting statistical histogram after all tables have been processed.

20. For use with a relational database having records in the form of tables of tuples stored therein, a computer readable storage medium comprising computer executable instructions for performing a method for compiling a statistical representation of an attribute for tuples that verify a user query wherein the user query comprises a join predicate that joins first and second database tables on a join attribute, the method comprising the steps of:

scanning the tuples contained in the second database table;

for each scanned tuple, determining a statistical multiplicity value based on a number of tuples from the first database table that have a matching join attribute with respect to the scanned tuple;

adding a number of copies of the scanned tuple to a stream of tuples wherein the number of copies added corresponds to the statistical multiplicity value determined for the scanned tuple;

sampling the stream of tuples to compile a statistical representation for values of the attribute in the sampled tuples; and storing the statistical representation in at least one memory, wherein determining the statistical multiplicity value is performed by accessing statistical information about the first and second tables and based on the statistical information determining a number of tuples in the first table that have a matching join attribute value to the scanned tuple, and wherein the statistical information comprises a first histogram on the first table that has a first bucket containing the join attribute value of the scanned tuple and a second histogram on the second table that has a second bucket containing the join attribute value of the scanned tuple, wherein each bucket has a frequency and a number of distinct values contained in the bucket, and wherein the statistical multiplicity value is calculated as the frequency of the join attribute in the first table divided by a maximum of the number of distinct values in the first bucket and the number of distinct values in the second bucket.

21. The computer readable storage medium of claim 20 wherein the step of scanning the tuples is performed by sequentially scanning the table.

22. The computer readable storage medium of claim 20 wherein the step of sampling the stream of tuples is performed by randomly sampling the stream of tuples.

23. The computer readable storage medium of claim 20 wherein the step of sampling the stream of tuples is performed by reservoir sampling.

24. The computer readable storage medium of claim 20 wherein the step of scanning the tuples is performed using an index on the second table that covers the attribute and the join attribute.

25. The computer readable storage medium of claim 20 wherein the query comprises predicate that joins a number n tables in n-, linear joins, the method comprising the steps of:

compiling a statistical representation for a first two of the n tables according to the method for compiling a statistical representation of an attribute for tuples that verify a user query;

iteratively performing the method for compiling a statistical representation of an attribute for tuples that verify a user query by:

accessing the statistical representation from the previous performance of the method;

scanning a next joined table that has not yet been scanned;

during each scan determining statistical multiplicity values based on the statistical representation for the previous performance of the method; and wherein the resulting statistical representation becomes the statistical representation for a next iterative performance of the method; and returning the resulting statistical representation to the memory after all tables have been processed.

26. The computer readable storage medium of claim 20 wherein the user query comprises an acyclic-join generating query that induces a join-tree having a root and nodes and wherein each node represents a table and each edge represents a join between a parent table and a child table, comprising the steps of:

performing a post-order traversal of the join-tree, and at each internal node in the join-tree:

obtaining statistical information about each child table;

performing the method for compiling a statistical representation of an attribute for tuples that verify a user query with respect to each child table connected to the parent at the node by scanning the parent table and using the obtained statistical information about the child table to determine a partial multiplicity for the parent table and each child table;

multiplying the partial multiplicities obtained for the child tables at the node and using the product of the partial multiplicities to construct a statistical representation for the parent table; and returning the statistical representation obtained at the root of the join-tree.

27. The computer readable storage medium of claim 20 wherein a plurality of statistical representations for attributes in tuples that verify a plurality of queries is sought, wherein each query comprises a join predicate, the method comprising:

for each query, generating a list of table scans that are necessary to compile the statistical representation for that query;

finding a shortest common supersequence with respect to the lists of table scans to determine a scan order for the tables;

scanning the tuples in each table according to the scan order and for each table:

according to the method for compiling a statistical representation of an attribute for tuples that verify a user query, determining and storing a partial statistical representation for the table for each query in which the table is referenced; and accessing the partial statistical representations to construct statistical representations for each of the plurality of queries according to the method.

28. The computer readable storage medium of claim 27 wherein the step of finding the shortest common supersequence is performed by:

constructing an acyclic directed graph by:

determining an initial node;

expanding the initial node by adding edges each corresponding to one of the tables in the list of table scans and connecting a new node to each edge wherein the new node corresponds to a list of all edges traversed to arrive at the node; and expanding each new node until a final node is reached that corresponds to the list of table scans to be performed; and finding a shortest path along the graph from the initial to the final node; and wherein the shortest path is the shortest common supersequence of tables to be scanned.

29. The computer readable storage medium of claim 28 wherein the step of expanding each new node is performed by adding new nodes based on the likelihood that the node will be on the shortest path.

30. The computer readable storage medium of claim 29 wherein the likelihood that the node will be on the shortest path is based on an estimate of the shortest common supersequence of suffixes of the shortest common supersequence of tables to be scanned that have not yet been processed.

31. The computer readable storage medium of claim 28 wherein the step of expanding each new node is performed based on dependency sequences that specify an order in which tables must be scanned.

32. The computer readable storage medium of claim 28 wherein the step of expanding each new node comprises the step of associating a cost with each added edge that represents a cost for scanning the table corresponding to the edge and wherein the step of finding the shortest path is performed by finding the path with the lowest cost.

33. The computer readable storage medium of claim 32 wherein the step of expanding each new node is performed by evaluating all possible nodes that may result from expansion and choosing at least one of the possible nodes for expansion based on the cost of the edge required to reach the node.

34. The computer readable storage medium of claim 33 wherein only the possible node with the lowest cost is expanded.

35. The computer readable storage medium of claim 20 wherein the query comprises a selection predicate having a selection criteria and wherein only tuples detected during scanning that meet the selection criteria are processed in the step of determining a statistical multiplicity value.

36. The computer readable storage medium of claim 20 wherein the statistical information comprises a multidimensional histogram.

37. The computer readable storage medium of claim 20 wherein a statistical representation for a plurality of attributes is compiled by scanning a joint distribution of the plurality of attributes and determining a statistical multiplicity for the scanned tuples.

38. For use with a relational database having records in the form of tables of tuples stored therein, an apparatus for compiling a statistical representation of tuples having an attribute with values that verify a user query, wherein the user query comprises at least one join predicate that joins first and second database tables on a join attribute comprising:

a table scanner for scanning the tuples in the second database table;

a multiplicity evaluator for determining a statistical multiplicity value based on a number of tuples in the first database table that have a matching join attribute with respect to the scanned tuple;

a tuple copier for copying a number of copies of the scanned tuple into a stream of tuples, wherein the number of copies corresponds to the statistical multiplicity value determined for the scanned tuple;

a tuple sampler for sampling tuples from the stream of tuples to compile a tuple sample;

a statistical representation construction tool for constructing a statistical representation of the tuple sample; and at least one memory for storing the statistical representation, wherein determining the statistical multiplicity value is performed by accessing statistical information about the first and second tables and based on the statistical information determining a number of tuples in the first table that have a matching join attribute value to the scanned tuple, and wherein the statistical information comprises a first histogram on the first table that has a first bucket containing the join attribute value of the scanned tuple and a second histogram on the second table that has a second bucket containing the join attribute value of the scanned tuple, wherein each bucket has a frequency and a number of distinct values contained in the bucket, and wherein the statistical multiplicity value is calculated as the frequency of the join attribute in the first table divided by a maximum of the number of distinct values in the first bucket and the number of distinct values in the second bucket.

39. The apparatus of claim 38 wherein the table scanner performs a sequential scan over the table.

40. The apparatus of claim 38 further comprising an apparatus for constructing multiple statistical representations each for tuples having attribute values that verify a distinct user query comprising:

a scan order generator for determining an order in which the table scanner should scan tables; and supplemental storage for storing the sampled tuples from the tuple sampler corresponding to each statistical representation of tuples verifying a user query.

41. The apparatus of claim 40 wherein the scan order generator comprises a supersequence compiler for determining a shortest common supersequence of tables to be scanned.

* * * * *